United States Patent [19]
Suzuki et al.

[11] Patent Number: 5,920,198
[45] Date of Patent: Jul. 6, 1999

[54] CAPACITANCE-TYPE DISPLACEMENT MEASURING DEVICE

[75] Inventors: Masamichi Suzuki; Seigo Takahashi, both of Kawasaki, Japan

[73] Assignee: Mitutoyo Corporation, Kawasaki, Japan

[21] Appl. No.: 08/999,748

[22] Filed: Sep. 15, 1997

[30] Foreign Application Priority Data

Sep. 20, 1996 [JP] Japan .................................. 8-249898

[51] Int. Cl.$^6$ .............................. G01R 27/26; G01B 3/18
[52] U.S. Cl. ...................... 324/662; 324/686; 324/690; 340/870.37; 341/15; 33/784
[58] Field of Search .................................. 324/660, 661, 324/662, 671, 683, 686, 690; 340/870.37; 341/15; 318/653, 661; 33/783, 784, 813, 825, 830, 706

[56] References Cited

U.S. PATENT DOCUMENTS

| | | | |
|---|---|---|---|
| 4,578,868 | 4/1986 | Sasaki et al. | 33/706 |
| 4,851,835 | 7/1989 | Krumholz et al. | 324/660 |
| 4,961,055 | 10/1990 | Habib et al. | 324/662 |
| 5,172,485 | 12/1992 | Gerhard et al. | 33/706 |
| 5,495,677 | 3/1996 | Tachikake et al. | 33/784 |
| 5,691,646 | 11/1997 | Sasaki | 324/662 |

FOREIGN PATENT DOCUMENTS

| | | |
|---|---|---|
| 0 716 290 | 6/1996 | European Pat. Off. . |
| A-716290 | 6/1996 | European Pat. Off. . |
| 0791801 | 8/1997 | European Pat. Off. . |
| 2264784 | 9/1993 | United Kingdom . |

Primary Examiner—Diep N. Do
Attorney, Agent, or Firm—Oliff & Berridge, PLC

[57] ABSTRACT

A rotatable rotor 41 and a stator 51 located at a predetermined gap between outer circumferential face of the rotor 41 provided with half-cylindrical inner circumferential face are provided. The both ends of the outer circumferential face of the rotor 41 are provided with a step portion 44 to retain a predetermined gap between the opposing faces of the rotor 41 and the stator 51, and a stopper portion 45 to be abutted to both end faces of the stator in the axial direction. A forcing means 61(plate spring) are also provided to force the stator 51 to the rotor 41 so that the inner circumferential face of the stator is abutted at the step portion 44.

13 Claims, 10 Drawing Sheets

F I G. 7
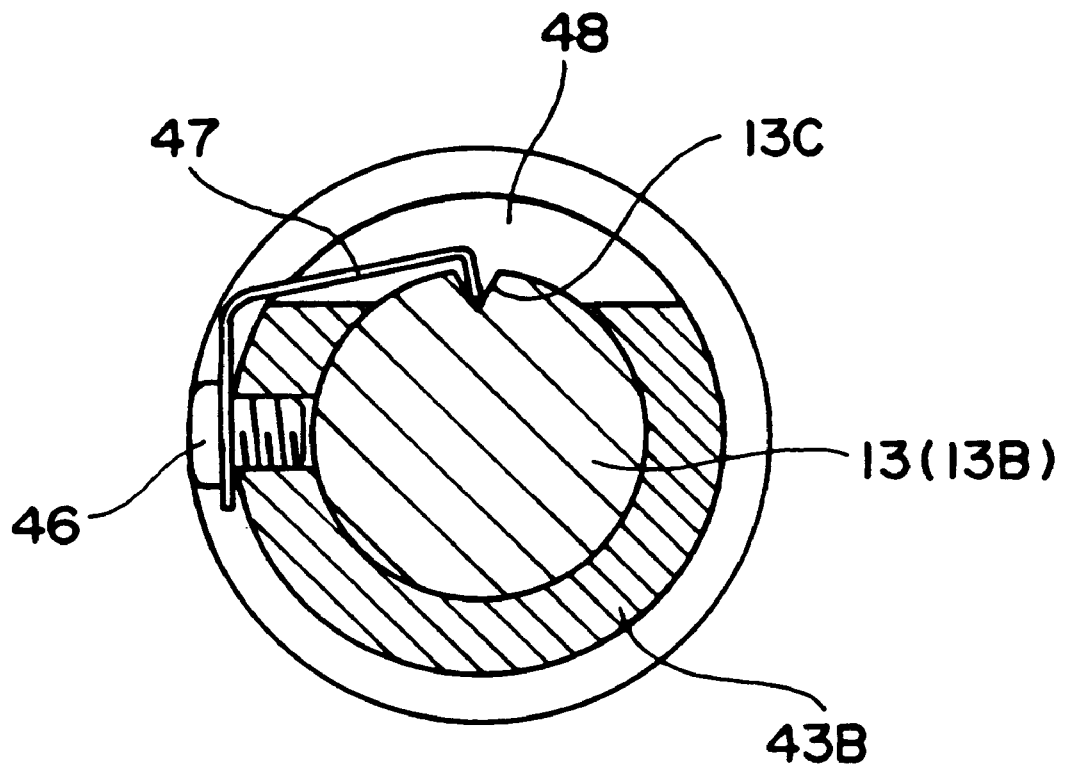

FIG. 10(A) PRIOR ART
FIG. 10(B) PRIOR ART
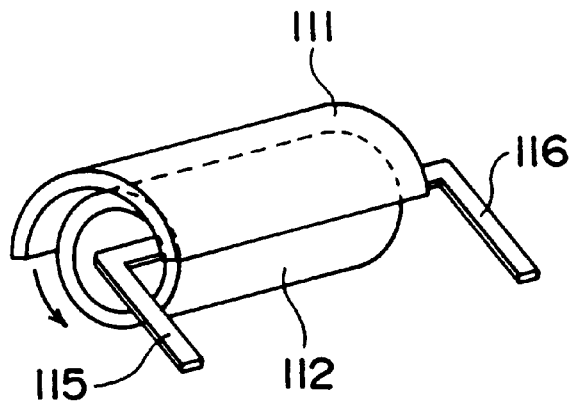
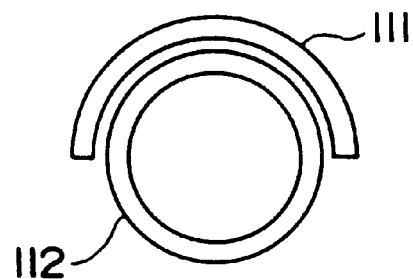
FIG. 10(C) PRIOR ART
FIG. 10(D) PRIOR ART
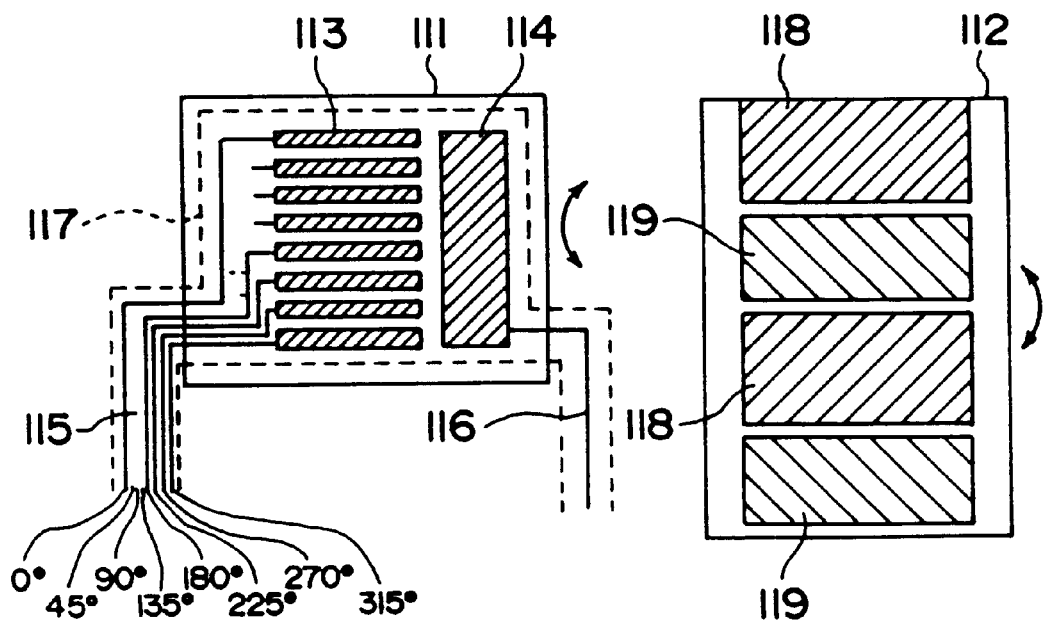

CAPACITANCE-TYPE DISPLACEMENT MEASURING DEVICE

BACKGROUND OF THE INVENTION

1. Filed of the Invention

This invention relates to capacitance-type displacement measuring device, which is suitable for small measuring device such as electric micrometer, inner diameter measuring machine and angle gauge.

2. Description of Related Art

Conventionally, "cylindrical displacement sensor", which is shown in European Patent Application Publication No. EP 0 716 290 A2, is known as an electronic measuring machine which detects displacement amount. This machine will be explained below with reference to FIG. 10 and 11.

FIG. 10(A) is a perspective disassembled view of a half-cylindrical body 111 as a stator and a cylindrical body 112 as a rotor, FIG. 10(B) is a side view thereof, and FIG. 1(C)(D) are each unrolled view of the half-cylindrical body 111 and the cylindrical body 112. The half-cylindrical body 111 is fixed, and the cylindrical body 112 can be rotated around the same axis as the half-cylindrical body 111 at a predetermined gap (0.1 to 0.2 mm).

As shown in FIG. 10(C), a transmitting electrode group 113, and receiving electrodes 114 which are insulated from the transmitting electrode group 113, are each formed on inner circumferential face of the half-cylindrical body 111. In this example, transmitting electrode group 113 is located over predetermined length from an end of the half-cylindrical body 111, extending narrow in axial direction, and at the same pitch in parallel to the axis, with eight electrodes as one unit. And alternating currents which have each different phase by 45 degrees are impressed to each of the electrode of this transmitting electrode group 113. Receiving electrode 114 is located on the other end of inner circumferential face of the half-cylindrical body 111 in half-ring-belt-shape along circumferential direction.

The transmitting electrode group 113 and receiving electrode 114 are pattern-formed on a FPC substrate 117, which is shown in a dotted line in this example. On the FPC substrate, along with the electrode patterns, lead-lines 115, 116 of the electrode patterns are formed, and they are attached to the inner circumferential face of half-cylindrical body 111. The lead-lines are drawn out from both ends of the half-cylindrical body 111.

As shown in FIG. 10(D), coupling electrode 118 and ground electrode 119 are each formed on an outer circumferential face of the cylindrical body 112. Two coupling electrodes 118 are formed at the same pitch as the width of eight electrodes of the transmitting electrode group 113 in circumferential direction to face four electrodes of the transmitting electrode group 113 on the half-cylindrical body 111, and at the same time, to face the receiving electrode 114 so that capacitive coupling occurs between these electrodes. This coupling electrode 118 is provided to receive a signal caused by capacitive coupling between the transmitting electrode group 113 and the coupling electrode 118 and to transfer the signal to receiving electrode 114 by capacitive coupling. These electrodes are formed on the FPC substrate of the outer circumferential face of the cylindrical body 112. Incidentally, the ground electrode 119 can be omitted.

In this structure, as cylindrical body 112 is rotated in a direction shown by an arrow in FIG. 10(A), an amount of displacement of the cylindrical body 112 relative to the half-cylindrical body 111 can be measured by detecting a phase of receive signal produced by the capacitive coupling between the transmitting electrode group 113 and the coupling electrode 118 resulting from the rotation displacement. In this case, as the transmitting electrode group 113 are divided into eight, and each electrode is actuated at a different-phase by 45 degrees, the rotation displacement amount can be measured at an accuracy at which the pitch of the coupling electrode 118 are divided into eight.

FIG. 11 briefly shows general structure of measuring circuit 120 which actuates the displacement sensor shown in FIG. 10 and processes signals. This measuring circuit 120 is composed of an oscillator 121 which outputs predetermined clock pulses, and a pulse modulator 112 which impresses eight-phased alternating-signals on each electrode of the transmitting electrodes group 113 each having different phases by 45 degrees. The output signal from the receiving electrode 114 is inputted to a phase comparator 124 via an integrator 123. The phase comparator 124 compares the phase of this input signal with a standard phase and detect the amount of rotation displacement as phase lag of input signal relative to a standard phase, and inputs the detected signal to a counter 125. The counter 125 counts the clock pulse outputted from the oscillator 121, and digitally displays the amount of rotation displacement on an indicator 126.

To achieve sufficient measuring accuracy in the aforementioned cylindrical displacement sensor, concentric accuracy between the half-cylindrical body 111 as a stator and the cylindrical body 112 as a rotor is needed. Specifically, a gap between the stator and the rotor need to be retained fixed in circumferential direction. But in producing a small-type cylindrical displacement sensor, it is very difficult to achieve highly accurate concentricity between the stator and the rotor.

Highly accurate measuring can be achieved even with low concentricity between the stator and the rotor by locating two units of electrodes in the circumferential direction and averaging the outputs of these units, thus offsetting the effect of low concentricity. But if it is needed to locate two units of electrodes in the circumferential direction to avoid problems occurred by low concentricity, production efficiency lowered because more wiring is needed between the sensors and outside electric circuits.

It is an object of this invention to solve the conventional problem and to provide capacitance-type displacement measuring device which can keep high concentricity between the stator and the rotor in a simple structure.

SUMMARY OF THE INVENTION

A capacitance-type displacement measuring device according to present invention provided with a rotatable rotor having circular-shaped outer circumferential face, and a stator having half-cylindrical inner circumferential face located at a predetermined gap against the outer circumferential face of the rotor, the inner circumferential face of the stator being provided with transmitting electrode group composed of plural electrodes impressed with respectively different-phased alternating signals and receiving electrode insulated from the transmitting electrode group, of which receive signal is inputted to measuring circuit, and the outer circumferential face of the rotor being provided with coupling electrode to couple capacitively with a plural of electrode of the transmitting electrode group, is characterized by a step portion provided on the outer circumferential face of the rotor or the inner circumferential face of the stator to retain a predetermined gap between the opposing surfaces of the rotor and the stator at both ends of either one of the rotor or the stator, and by a forcing means to force the stator so that the rotor and the stator is abutted at the step portion.

According to this structure, the concentricity between the stator and the rotor can be achieved in a simple structure, that is, only by providing a step portion having height corresponding to a gap between the rotor and the stator on the outer circumferential face of the rotor or the inner circumferential face of the stator, and by providing a forcing means to force the stator to the stator so that the rotor or the stator is abutted to the step portion. Accordingly, the gap between the stator and the rotor can be retained at a fixed level in circumferential direction, thus achieving high-precision capacitance-type displacement measuring device.

Also, a capacitance-type displacement measuring device according to present invention provided with a rotatable rotor having circular-shaped outer circumferential face, and a stator having half-cylindrical inner circumferential face located at a predetermined gap against the outer circumferential face of the rotor, the inner circumferential face of the stator being provided with transmitting electrode group composed of plural electrodes impressed with respectively different-phased alternating signals and receiving electrode insulated from the transmitting electrodes, of which receive signal is inputted to measuring circuit, and the outer circumferential face of the rotor being provided with coupling electrode to couple capacitively with plural of the transmitting electrodes, is characterized by a step portion provided on both ends of the outer circumferential face of the rotor to retain a predetermined gap between the opposing surfaces of the rotor and the stator, by a stopper portion provided on both ends of the outer circumferential face of the rotor being abutted to both of the end faces of the stator in the axial direction, and by a forcing means to force the stator to the rotor so that the rotor and the stator are abutted at the step portion.

According to this structure, the gap between the stator and the rotor can be retained securing the rotor and the stator at a fixed position in the axial direction by forming step portion having height corresponding to the gap on the outer circumferential face of the rotor, and by forming a stopper portion being abutted to both end faces of the rotor in the axial direction. Accordingly, in measuring rotations of a spindle by a stator and a rotor in an electric micrometer in which the spindle displaces in the axial direction rotatively, high-precision electric micrometer can be achieved because the rotor and the stator can be secured at a fixed position in the axial direction.

In the above invention, the step portion and the stopper portion can be either projectingly formed on both ends of the rotor unitedly, or formed on end members produced as other body attached and fixed on both of the ends of the rotor. In this way, the step portion and the stopper portions can be processed easily.

In the above case, by providing engaging means to engage a rotator as a subject of displacement measuring on at least one of the end members, the rotating body and the end members, namely, the rotor can be engaged by the engaging means, therefore, the rotor can be rotated with the rotation of the rotating body.

Preferably, the forcing means is composed of a plate spring, a fixed thereof being fixed, and the other end thereof being abutted to the stator to force the stator in a first direction orthogonal to a rotation axis of the rotor. Also preferably, the plate spring is provided with curved portion between the fixed end and the other end being displaceable in a second direction orthogonal to the rotation axis of the rotor and also orthogonal to the first direction.

The stator can be forced to the first and second direction being orthogonal to the axial direction of the rotor and also orthogonal with each other only by a single plate spring, thus resulting in decrease in numbers of parts.

In this case, the forcing means can be provided by a single plate spring, but preferably the forcing means is provided as a pair of plate springs on both ends of the stator to force both ends of the stator in the first direction orthogonal to the rotation axis. The pair of plate springs may be connected with each other at the fixed ends thereof.

And preferably, a projection is provided on the stator on which the other end of the plate spring is contacted, and an engaging hole is provided on the plate spring to engage with the projection. Thus, in spite of rotational force working on the stator caused by rotational friction produced by rotation of the rotor, the rotation of the stator is restricted by the projection of the stator and the engaging hole on the plate spring, so the stator can be secured at a fixed position even when the rotor is rotated.

Also, the capacitance-type displacement measuring device according to present invention used for a micrometer composed of a main body having an anvil on an end thereof and a spindle screwed onto the other end of the main body to displace in axial direction with screw rotation of the spindle to detect a displacement amount in the axial direction, the spindle being provided with a rotatable rotor having circular-shaped outer circumferential face, and the main body being provided with a stator having half-cylindrical inner circumferential face located at a predetermined gap against the outer circumferential face of the rotor, the inner circumferential face of the stator being provided with transmitting electrode group composed of plural electrodes impressed with respectively different-phased alternating signals and receiving electrode insulated from the transmitting electrodes, of which receive signal is inputted to measuring circuit, the outer circumferential face of the rotor being provided with coupling electrode to couple capacitively with a plural of electrode of the transmitting electrode group, is characterized by a step portion provided on the outer circumferential face of the rotor at both ends to retain a predetermined gap between the opposing surfaces of the rotor and the stator, by a stopper portion provided on the outer circumferential face of the rotor being abutted to both of the end faces of the stator in the axial direction, and by a forcing means to force the stator to the rotor so that the rotor and the stator are abutted at the step portion.

In this structure, the spindle is screw-rotated against the main body displacing in the axial direction in measuring an measured object. Then, the rotor is rotated with the rotation of the spindle. At this time, because the step portion having height corresponding to the gap between the rotor and the stator and the stopper portion which is abutted to both of the end faces of the stator in the axial direction are formed on the outer circumferential face of the rotor, the rotor is rotated without moving in axial direction of the spindle, in other words, securing a fixed position relative to the stator in the axial direction of the spindle, and retaining a fixed gap between the stator by the step portion. Accordingly, the gap between the stator and the rotor in the circumferential direction can be retained at a fixed level securing the rotor and the stator at a fixed position in the axial direction, thus achieving a high-precision micrometer.

In the above invention, preferably, the step portion and the stopper portion are formed on end members attached and fixed at both ends of the rotor, and the end members are provided with a through-hole through which a distal portion of a plate spring is engaged to a groove formed on the spindle along the axial direction thereof, the base end of the plate spring being fixed to the end member.

In this way, when the spindle screw-rotates against the main body and displaces in the axial direction, whereas the rotation of the spindle can be transferred to the rotor by way of the plate spring engaged to the groove on the spindle, the rotor and the stator is secured at a fixed position in the axial direction, because the groove of the spindle slides relative to the plate spring with regard to the displacement of the spindle in the axial direction, that is, the spindle is allowed to displace in the axial direction without moving the rotor, thus only the rotation of the spindle can be transferred to the rotor.

BRIEF DESCRIPTION OF THE DRAWINGS

FIG. 7 is a sectional view taken along S7—S7 line of FIG. 6;

FIGS. 10(A)–10(D) is a view showing a structure of conventional cylindrical displacement sensor;

DETAILED DESCRIPTION OF THE PREFERRED EMBODIMENT(S)

The preferred embodiment of capacitance-type displacement measuring device according to present invention applied to an electric micrometer will be explained below with reference to the attached drawings.

Figure 1:
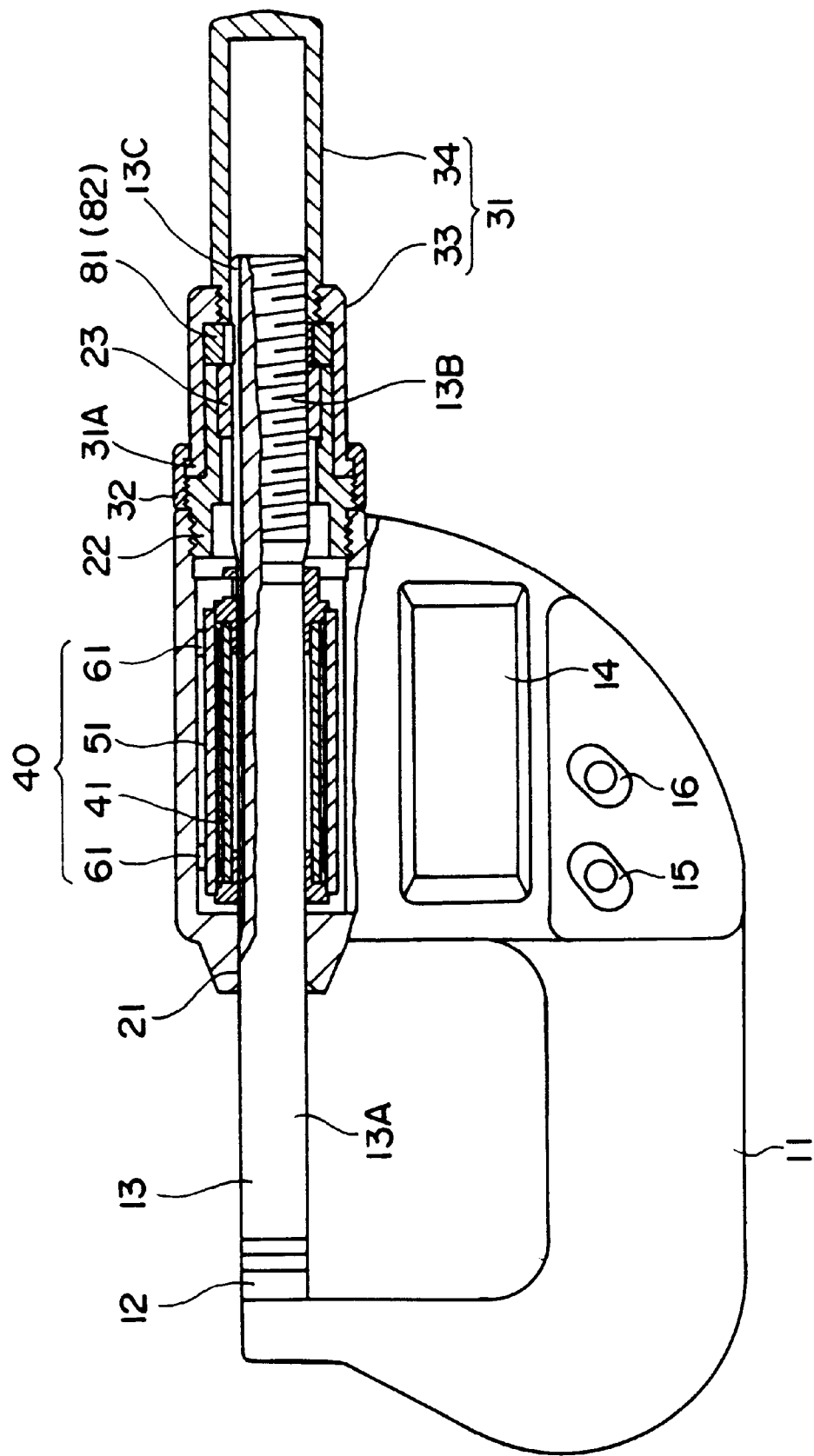
FIG. 1 is a partially cut front view showing the preferred embodiment applying a capacitance-type displacement measuring device according to present invention.
Figure 2:
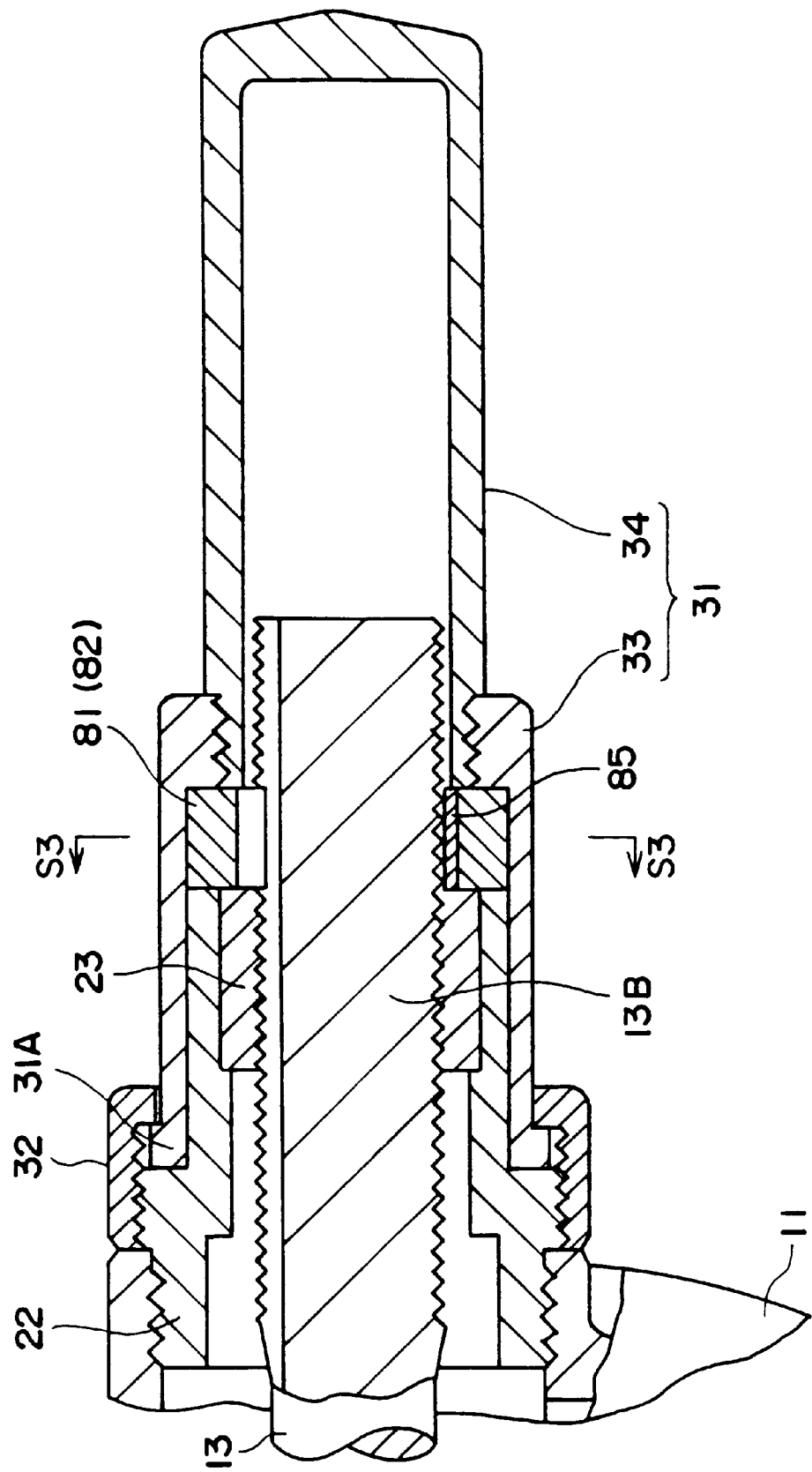
FIG. 2 is a fragmentary enlarged view showing thimble part of the aforementioned embodiment.

FIG. 1 shows an electric micrometer according to present invention. In the drawing, a frame 11 as a main body formed in almost U-shape is provided with an anvil 12 fixed on inner side of one of the ends of the frame, and a spindle 13 screwed on the other end, being displaceable in the axial direction and moving back and forward relative to the anvil 12. Incidentally, 14 shows a digital-indicator which digitally displays the displace amount of spindle 13, 15 shows an on-off switch of power supply, and 16 shows a zero-set switch.

And a bearing hole 21 is formed on an inner side of the other end of the frame 11, and an end of a sleeve 22 is screwed onto an outer side of the other end. A nut member 23 is force fitted and fixed onto the other end of the sleeve 22. The spindle 13 is screwed onto the nut member 23.

The spindle 13 is provided with a shaft 13A slidably supported in the bearing hole 21, and a screw portion 13 B having a slight larger diameter than the shaft 13A and screwed onto the nut member 23. A V-shaped groove 13C is formed along the axial direction from halfway of the shaft 13A, extending over the whole length of the screw portion 13B.

On the outer circumference of the sleeve 22, a tubular thimble 31, having a collar portion 3 1A at an end thereof, is provided rotatably around an axis of the spindle 13, and further, a cap nut 32 is screwed, to cover the collar portion 31A from the outside to secure the thimble 31 at a fixed position in the axial direction,. The thimble 31 is composed of a cylinder body 33, supported rotatably on the outer circumference of the sleeve 22, and a cap 34 covering the other end of the spindle 13 to be screwed into the other end of the cylinder body 33. The internal diameter of the cap 34 is formed to be slightly larger than the outer diameter of the spindle 13 (outer diameter of the screw portion 13B), doubling as a stopper to be abutted to the end face of a plate spring (mentioned below) when being screwed into the other end of the cylinder body 33.

Between the thimble 31 and the spindle 13, a rotation transfer means 81 is provided to transfer the rotation of the thimble 31 to the spindle 13 and allow the spindle to displace in the axial direction. Here, a ratchet system 82 is used as the rotation transfer means 81 to transfer the rotation of the thimble 31 to the spindle 13, and at the same time, make the thimble turn free when more than a predetermined load is applied to the spindle 13.

Figure 3:
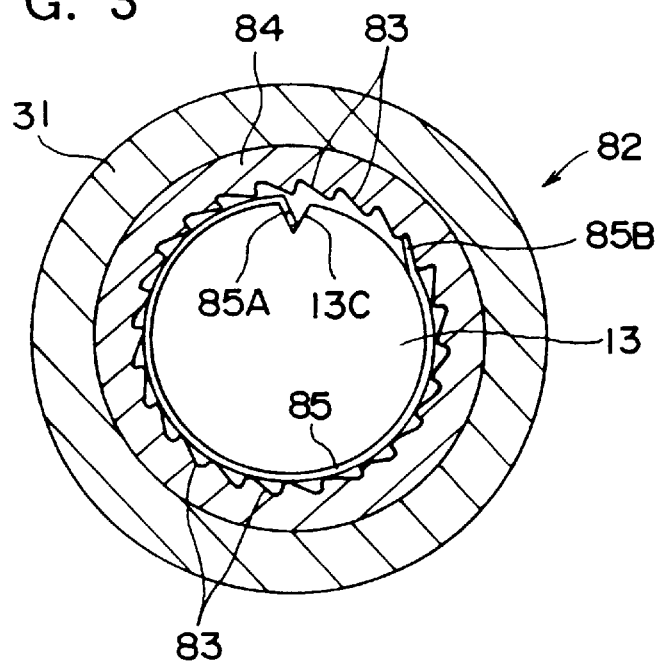
FIG. 3 is a sectional view taken along S3—S3 line of FIG. 2.
Figure 4:
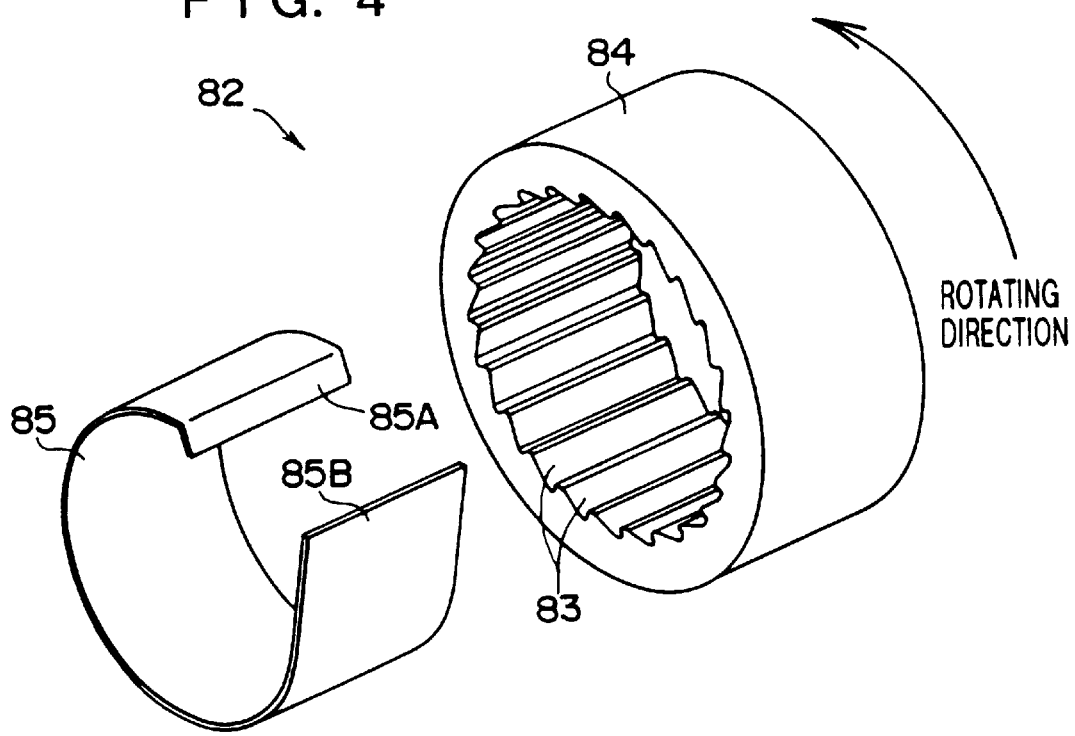
FIG. 4 is a disassembled perspective view showing ratchet mechanism of aforementioned embodiment.

As shown in FIG. 3 and FIG. 4, the ratchet system is composed of a ratchet ring 84 secured in the thimble 31 and provided with a saw-tooth projection 83 on the inner circumferential face thereof, and the plate spring 85, inserted between the ratchet ring 84 and the outer surface of the spindle 13 to be wound on the spindle 13, in which one end 85A of the plate spring 85 is engaged in the groove 13C formed along the axial direction of the spindle 13, and the other end 85B is forcibly forced to the saw-tooth projection 83 of the ratchet ring 84.

Figure 5:
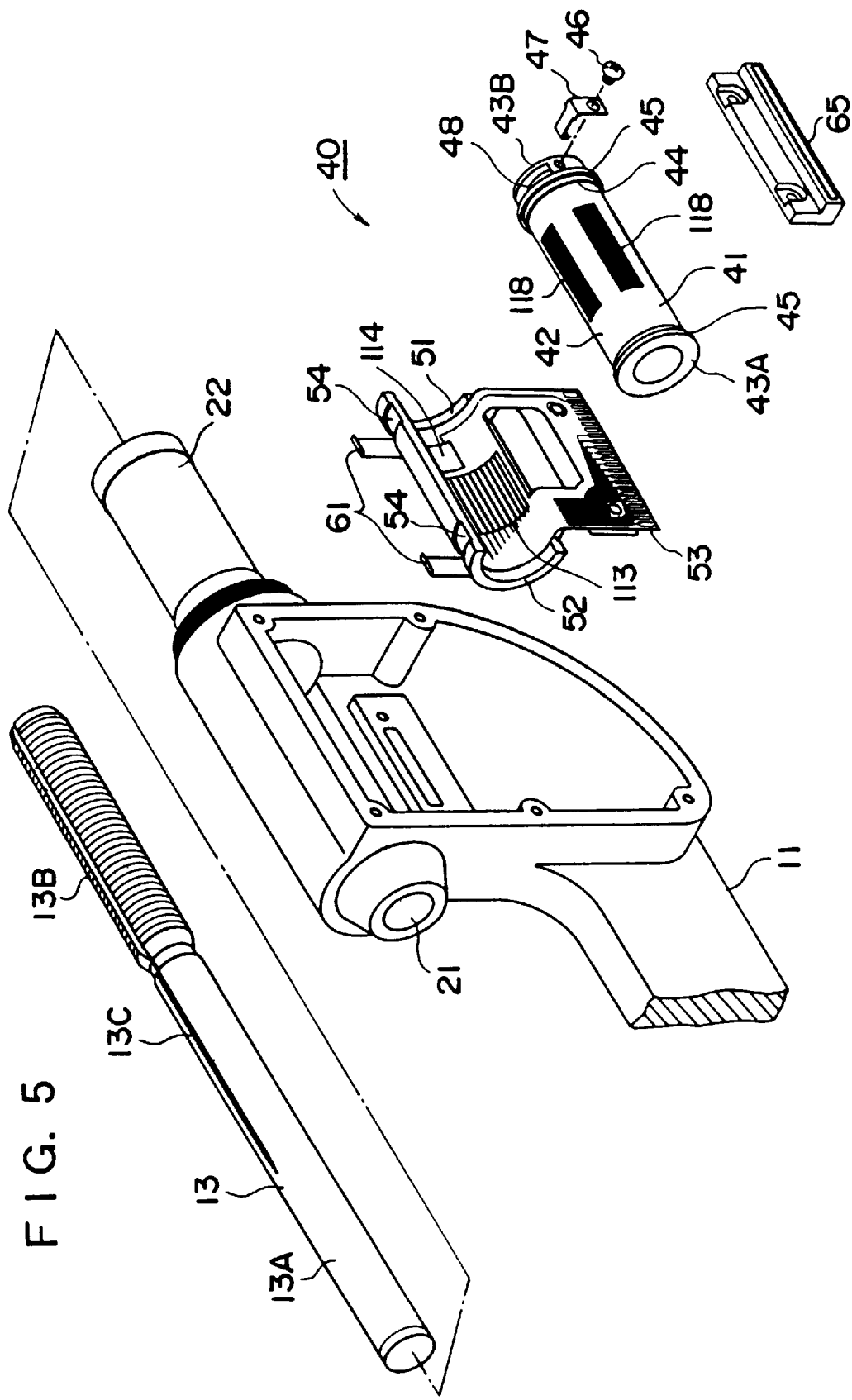
FIG. 5 is a disassembled perspective view of cylindrical displacement sensor part of aforementioned embodiment.
Figure 11:
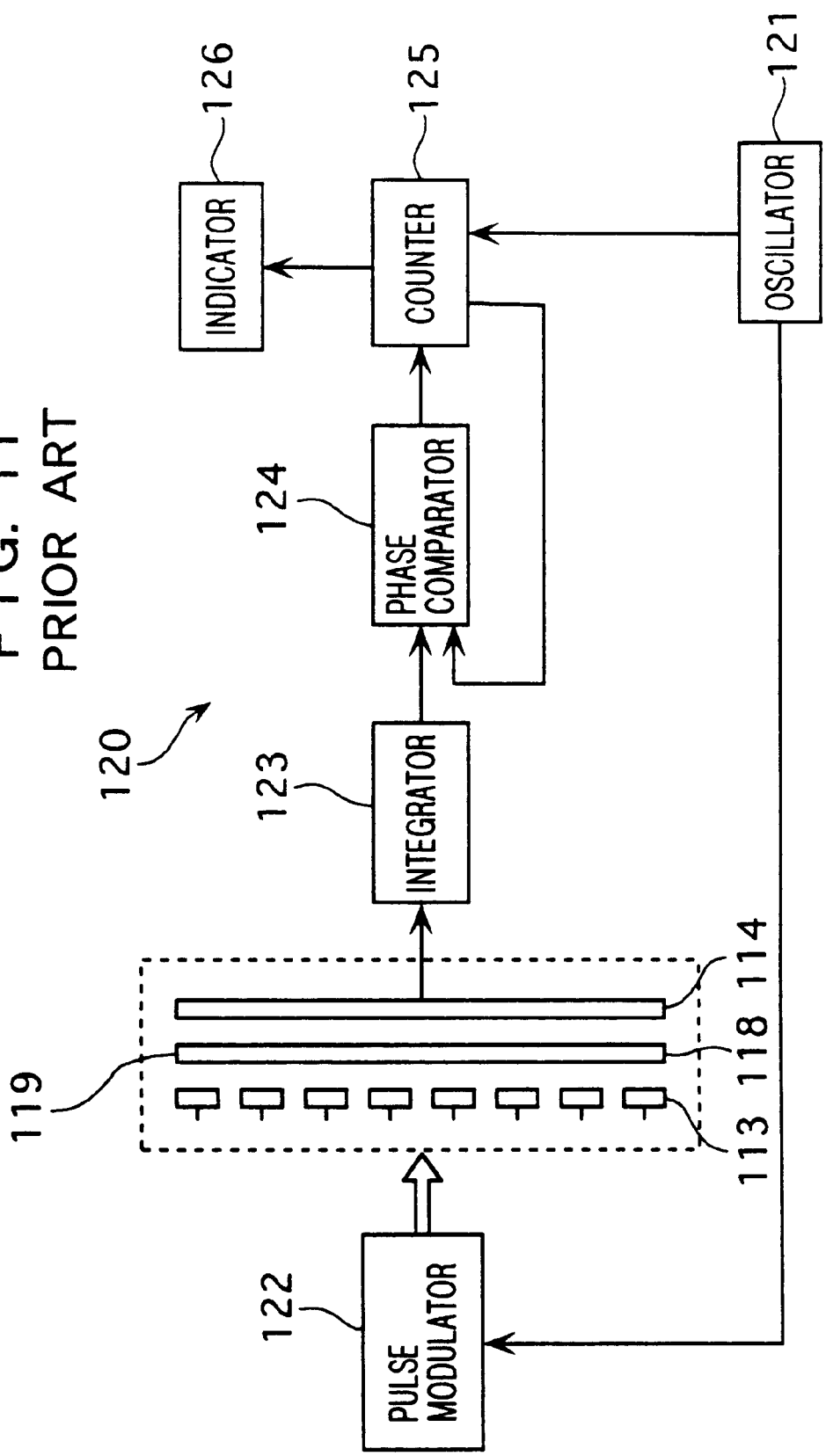
FIG. 11 is a circuit diagram showing a measuring circuit of conventional cylindrical displacement sensor.

Between the bearing hole 21 and the sleeve 22, a cylindrical displacement sensor 40 is provided to detect displace amount of the spindle 13 in the axial direction from the rotation amount of the spindle 13. As shown in FIG. 5, the cylindrical displacement sensor 40 is composed of a rotatable rotor 41 having circular outer circumferential face, a stator 51 having half-cylindrical inner circumferential face located at a predetermined gap to the outer circumferential face of the rotor 41, and a forcing means 61 to force the stator 51 to the rotor 41. Electrodes shown in FIG. 10 are provided on the rotor 41 and the stator 51. Specifically, on the inner circumferential face of the stator 51, transmitting electrode group 113 composed of plural electrodes each impressed with different-phased alternating current, and receiving electrode 114 insulated from the transmitting electrodes of which receive signal being inputted into the measuring circuit 120 (see FIG. 11). And on the outer circumferential face of the rotor 41, coupling electrode 118 is provided to couple capacitively with a plural of the electrodes of the transmitting electrode group 113 simultaneously.

Figure 6:
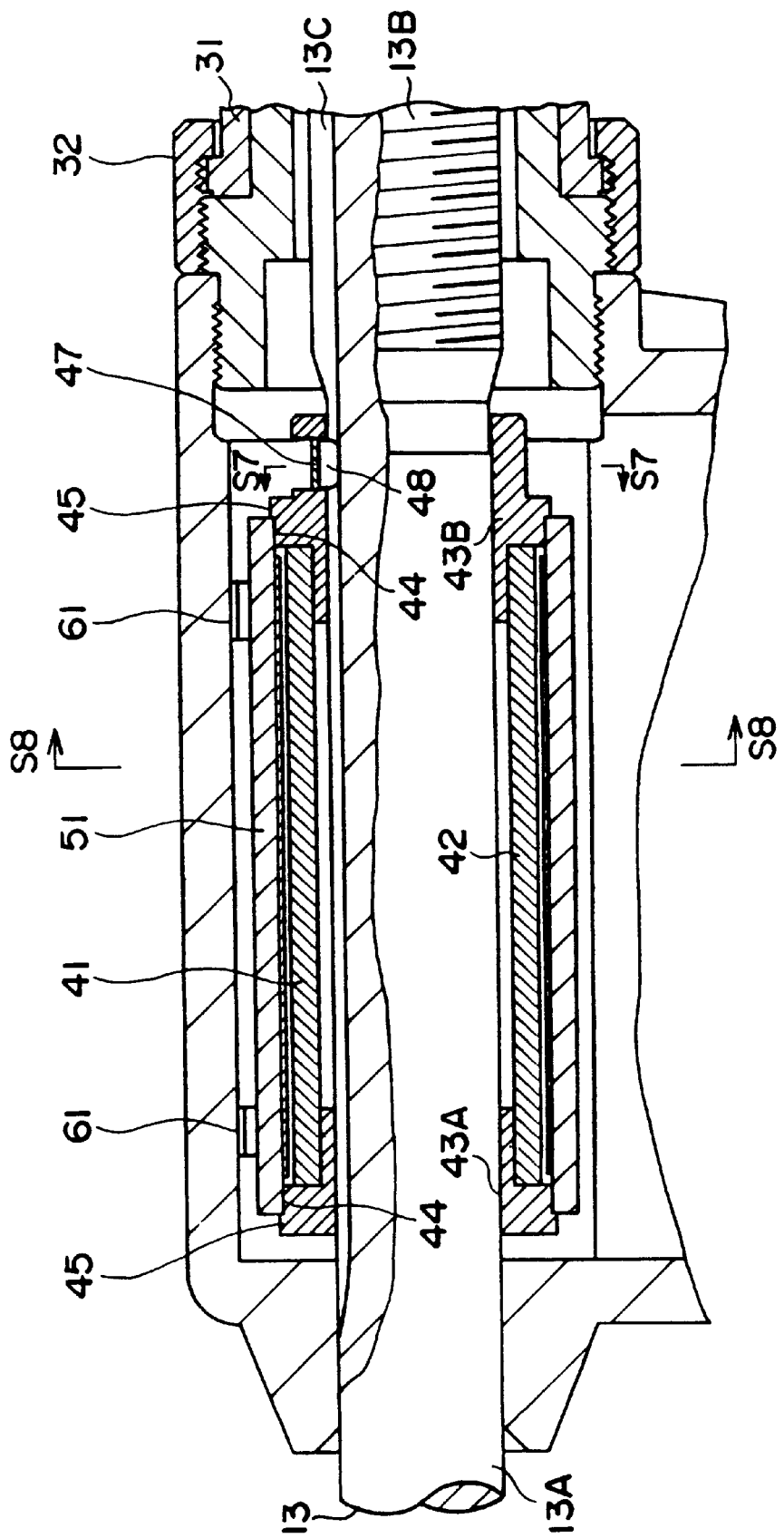
FIG. 6 is a sectional view of cylindrical displacement sensor part of aforementioned embodiment.

As shown in FIG. 6, the rotor 41 is composed of a cylinder body 42 provided with the coupling electrode 118 on the outer circumferential face, and end members 43A and 43B attached on both ends of the cylinder body 42 and made of anti-frictional resin. Each end member 43A and 43B is provided with step portion having a slightly larger outer diameter than an outer diameter of the cylinder body 42, to retain a predetermined gap between the opposing faces of the rotor 41 and the stator 51, and a stopper portion 45 outside the step portion 44 having larger outer diameter than that of the step portion 44, to be abutted on both end faces of the stator in the axial direction. Incidentally, on the outer circumferential face of the end member 43B, a base end of a first spring plate 47 as an engaging means is secured through stopping screw 46, and a through-hole 48 is formed to engage a distal portion of the first plate spring 47 to the groove 13C of the spindle 13 (See FIG. 5 and 7). In this way, the rotor 41 is rotated by the rotation of the spindle 13, but the rotor 41 does not move in spite of the displacement of the spindle 13 in the axial direction.

The stator 51 is composed of half-cylindrical body 52 and FPC substrate printed on the inner circumferential face of the half-cylindrical body 52 and provided with the transmitting electrode group 113 and receiving electrode 114 formed in a pattern. On the outer circumferential face of the half-cylindrical body 52, groove 54 is formed to accommodate the forcing means 61 and a projection 55 is formed halfway along the groove 54 (See FIG.8).

Figure 8:
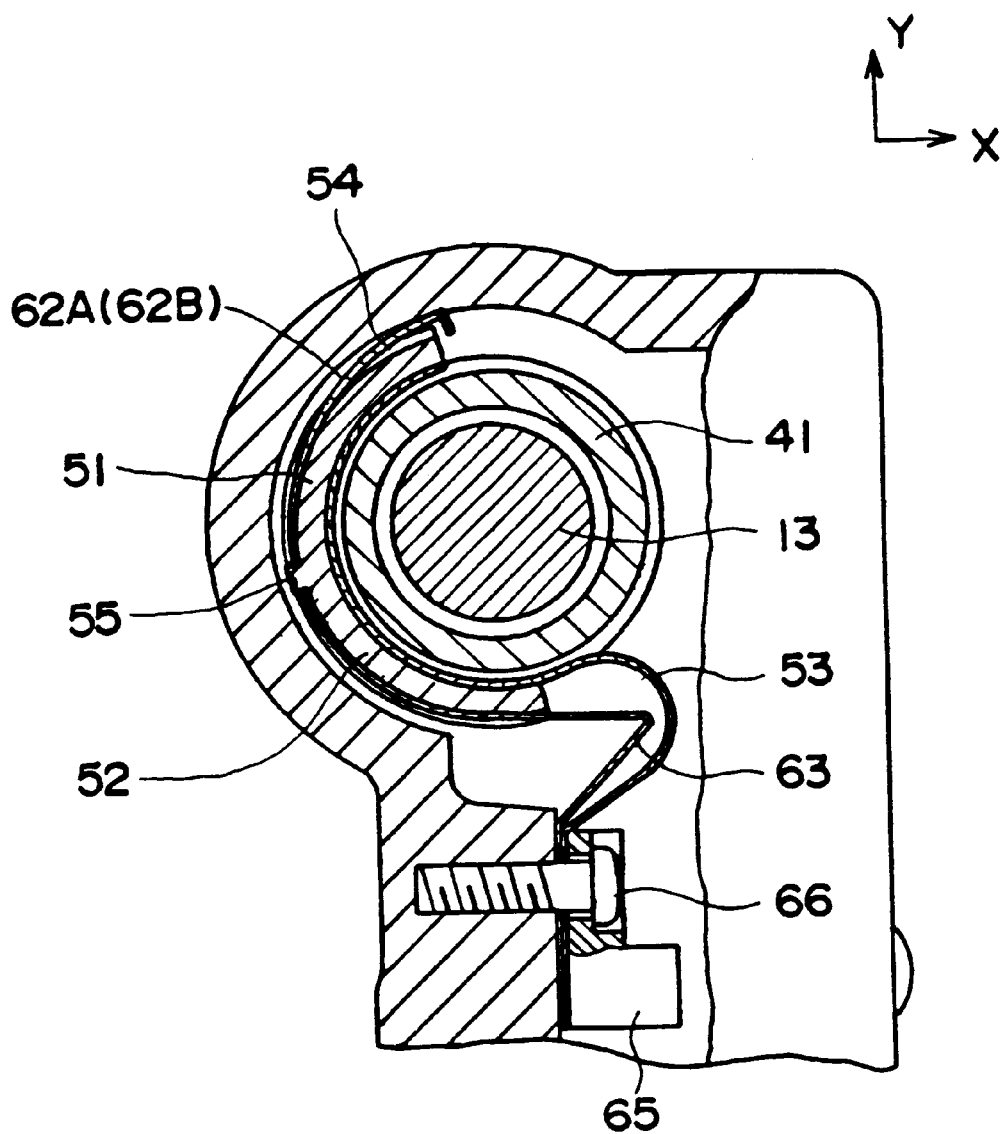
FIG. 8 is a sectional view taken along S8—S8 line of FIG. 6.
Figure 9:
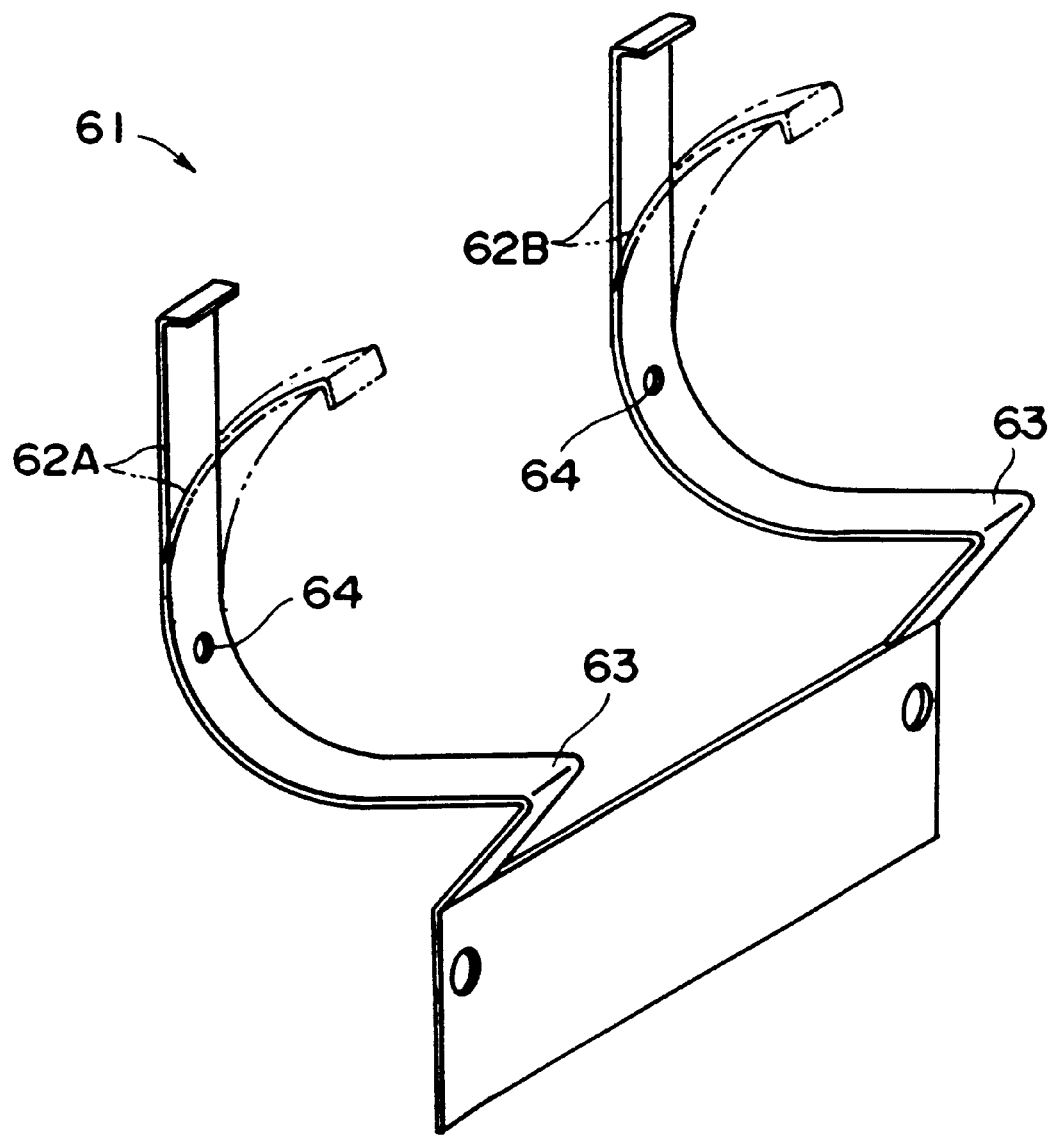
FIG. 9 is a perspective view of a forcing means (plate spring) of aforementioned embodiment.

As shown in the FIG. 8 and 9, the forcing means 61 is composed of a pair of second plate springs 62A and 62B, a fixed end of the second plate springs being connected with each other and secured in the frame 11, and the other end being accommodated in the groove 54 of the stator 51. Once provided in the frame 11 with being accommodated in the groove 54, each second plate spring 62A and 62B are bent as shown in FIG. 8, thus forcing the stator 51 to a first direction orthogonal to the rotation axis of the rotor 41 (X direction in FIG. 8). Further, curved portion 63 is provided on each second plate spring 62A and 62B between the fixed end and the other end to displace the stator 51 to a second direction orthogonal to the rotation axis of the rotor 41 and also orthogonal to the first direction. Incidentally, each of the second plate spring 62A and 62B is provided with engaging hole 64 to which the projection 55 engages. 65 and 66 are each a securing plate and a securing screw to secure the fixed end of the second plate springs 62A and 62B to the frame 11 together with FPC substrate 53.

In the structure described thus far, the measuring is carried out by holding the measured subject(not shown) with, for example, the left hand and holding the frame 11 with the right hand. When the thimble 31 is rotated by the thumb and the index finger of the right hand, the rotation of the thimble 31 is transferred to the spindle 13 through the ratchet system 82. Then, being screwed onto the nut member 23 provided to the frame 11, the spindle 13 is rotatively displaced in the axial direction. The rotor 41 is rotated against stator 51 with the rotation of the spindle 13, the rotation amount is detected by electrodes 113, 114 and 118, and is indicated on a digital indicator 14.

At this time, when measured subject is clamped by the anvil 12 and the spindle 13 displacing the spindle 13, the spindle 13 cannot be displaced in the direction closer to the anvil 12, namely, cannot be rotated in the direction, the ratchet ring 84 turns free relative to the plate spring 85 of the ratchet system. Thus a measurement can be done under steady measurement pressure by reading out indicated value of the digital indicator 14 at this time.

According to aforementioned embodiment, by providing the step portion 44 on the outer circumferential face of the end members 43A and 43B of the rotor 41 having height corresponding to a gap between the stator 51 and the rotor 41, and by providing the forcing means 61 on the step portion 44 to force the stator 51 to the rotor 41 so that the step portion 44 and the inner circumferential face of the stator 51 are abutted, the concentricity between the stator 51 and the rotor 41 can be secured in a simple structure. Accordingly, the gap between the stator 51 and the rotor 41 can be retained at a fixed level in the circumferential direction, thus achieving a high-precision electric micrometer.

And the stopper portion 45 being abutted on both end faces of the stator 51 in the axial direction, is provided on the outer side of the step portion 44, thus securing steady position of the rotor 41 relative to the stator 51, even when the spindle 13 rotatively displaces in the axial direction. Namely, as the spindle 13 displaces in the axial direction, the rotor 41 tends to be displaced in the same direction, but because the stopper portion 45 is attached to both end faces of the stator 51, the rotor 41 cannot be displaced, thus securing steady position of the rotor 41 relative to the stator 51.

Further, by providing the through-hole 48 on the end member 43B having the step portion 44 and the stopper portion 45, and securing base end of the first plate spring 47, the distal portion thereof engaging to the groove 13C formed along the axial direction of the spindle 13 through the through-hole 48, only the rotation of the spindle 13 can be transferred to the rotor 41, securing the steady position of the rotor 41 and the stator 51 in the axial direction, allowing the displacement of the spindle 13 in the axial direction, namely, the rotor without being displaced.

Further, by composing the forcing means 61 of the second plate spring 62A and 62B which force the stator 51 in a first direction (X direction) orthogonal to the rotation axis of the rotor 41, and by providing the curved portion 63 halfway of the second plate spring 62A and 62B which is displaceable in the direction orthogonal to the axial direction of the rotor 41 and also orthogonal to the first direction, stator 51 can be forced in the first direction (X direction) and the second direction (Y direction) being orthogonal to the rotation axis of the rotor 41 and orthogonal with each other, thus the numbers of parts can be reduced.

And by providing a projection 55 on the outer circumferential face of the stator 51 on which an end of the second plate springs of 62A and 62B is engaged, and by providing an engaging hole 64 on the second plate spring 62A and 62B on which the projection 55 engages, the position of the stator 51 can be secured at a steady position when the rotor 41 is rotated and rotational force is applied to the stator 51, because the rotation of the stator is restricted by the projection 55 of the stator 51 and the engaging hole 64 of the second plate springs 62A and 62B.

Further, a main scale graduation or an auxiliary scale graduation included the conventional micrometers is omitted, thus an outer sleeve to form the main scale is not needed. As a result, cost for processing the main scale graduation and so on can be reduced, and the numbers of parts and processes of the assembly also can be reduced, resulting in reduction in cost.

Further, by providing thimble 31 rotatably on the other end of the frame 11 through sleeve 22 and by providing rotation transfer means 81 between the thimble 31 and the spindle 13, the rotation of the thimble 31 is transferred to the spindle 13 through the rotation transfer means 81, and the spindle 13 is displaced in the axial direction, when the thimble 31 is rotated in measuring. Thereupon, the displace amount of the spindle 13 is detected by the cylindrical displacement sensor 40, and is digitally indicated on the digital indicator 14. At this time, even when the spindle 13 is displaced in the direction away from the anvil 12, because the thimble 31 is located rotatably at a fixed position in the frame 11, namely, thimble 31 is not displaced with the displacement of spindle 13, deterioration in operability when the spindle 13 is displaced on a large scale can be avoided.

The rotation transfer means 81 is structured with the ratchet system, so that the thimble 31 turns free relative to the spindle 13 when a measured subject is clamped by the spindle 13 and anvil 12 and more than predetermined load is applied to the spindle 13, thus measurement can be carried out at a steady measuring pressure. As a result high-precision measurement is ensured.

Further, the ratchet system 82 is composed of the ratchet ring 84 fixed in the thimble 31 and provided with the saw-tooth projection 83 on the inner circumferential face thereof, and the plate spring 85 inserted between the ratchet ring 84 and the outer circumferential face of the spindle 13, resulting in fewer number of parts, compact structure, easy assembly, and reduction in cost. Furthermore, the plate spring 85 is forced toward outside, so that the screw portion 13B of spindle 13 is less likely to be damaged.

The thimble 31 is composed of the cylinder body 33 rotatably held on the other end of the frame 11 and the cap 34 screwed onto the other end of the cylinder body 33, so in stopping an end 85A of the plate spring 85 of the ratchet system 82 to the groove 13C of the spindle 13, the stopping process can be carried out with looking through a hole of the cylinder body 33, thus easily stopping the end 85A of the plate spring 85 to the groove 13C of the spindle 13. Incidentally, the groove 13C works as means to synchronizingly rotate the rotor 41 with the rotation of the spindle 13, and also works as means to allow displacement of the spindle 13 in the axial direction, thus no special grooves are needed to be processed to stop the end 85A of the plate spring 85.

Furthermore, because the inner diameter of the cap 34 is formed slightly larger than the outer diameter of the spindle 13, the plate spring 85 can be retained at a steady position because the cap 34 prevents the move of the plate spring 85 in the axial direction with the displacement of the spindle 13 in the axial direction.

Incidentally, in the aforementioned embodiment, the step portion 44 is formed on both ends of the outer circumferential face of the rotor 41, but the same kind of effect can be achieved by forming step portions on both ends of the inner circumferential face of the stator 51.

And in the aforementioned embodiment, the stator 51 is forced in the first direction (X direction) and the second direction (Y direction) orthogonal to the axis of the rotor 41 and also orthogonal with each other by one second plate spring 62A and 62B, but different plate springs can be provided to force the stator 51 in each directions (X,Y direction).

Further, the transmitting electrode group 113 can be provided in a pattern extending narrow in the axial direction or a in spiral pattern, in addition to the pattern described in the aforementioned embodiments. If the pattern is formed in a spiral pattern, especially, high-precision measurement can be achieved by offsetting the effect, even when the axis of the rotor 41 and the stator 51 lacks concentricity.

Further, in the aforementioned embodiment, the end members 43A and 43B is composed of an anti-friction resin, but preferably, the members are composed of metal to keep high-precision for a long time. In the embodiment described thus far, the step portion 44 and the stopper portion 45 can be subject to wear because the stator 51 and the rotor 41 are slid each other at the step portion 44 and the stopper portion 45 as the rotor 41 is rotated. But when the members are composed of metal, abrasion can be decreased, thus keeping the high-precision measurement for a long time.

In the aforementioned embodiment, specifically the application on electric micrometer is explained, but this invention can also be applied on inner diameter measuring machine or angle gauge.

According to the capacitance-type displacement measuring device according to the present invention, by providing a step portion having height corresponding to the gap between the stator and the rotor on the outer circumferential face of the rotor or the inner circumferential face of the stator, and by providing the forcing means to force the stator or the rotor to the step portion so that the rotor or the stator is abutted to the step portion, the concentricity between the stator and the rotor can be achieved in a simple structure. Thus achieving a high-precision capacitance-type displacement measuring device by retaining the gap between the stator and the rotor at a fixed level in the circumferential direction.

What is claimed is:

1. A capacitance-type displacement measuring device provided with a rotatable rotor having circular outer circumferential face, and a stator having half-cylindrical inner circumferential face located at a predetermined gap against the outer circumferential face of the rotor, wherein;

the inner circumferential face of the stator is provided with transmitting electrode group composed of plural electrode being impressed with respectively different-phased alternating signals, and a receiving electrode insulated from the transmitting electrode group, of which receive signal is inputted into measuring circuit, and the outer circumferential face of the rotor is provided with a coupling electrode to couple capacitively with a plural of the electrode of the transmitting electrode group, characterized by;

a step portion provided on one of the outer circumferential face of the rotor and the inner circumferential face of the stator to retain a predetermined gap between the opposing faces of the rotor and the stator, and a forcing means to force the stator to the rotor so that the rotor and the stator is abutted at the step portion.

2. A capacitance-type displacement measuring device provided with a rotatable rotor having circular outer circumferential face, and a stator having half-cylindrical inner circumferential face located at a predetermined gap against the outer circumferential face of the rotor, wherein;

the inner circumferential face of the stator is provided with transmitting electrode group composed of plural electrode impressed with respectively different-phased alternating signals, and a receiving electrode insulated from the transmitting electrode group, of which receive signal is inputted into measuring circuit, the outer circumferential face of the rotor being provided with a coupling electrode to couple capacitively with a plural of the electrode of the transmitting electrode group, characterized by;

a step portion on both ends of the outer circumferential faces of the rotor to retain a predetermined gap between the opposing faces of the rotor and the stator, a stopper portion on both ends of the outer circumferential faces of the rotor, being abutted to both end faces of the stator in the axial direction, and a forcing means to force the stator to the rotor so that the rotor and the stator are abutted at the step portion.

3. The capacitance-type displacement measuring device according to claim 2, wherein the step portions and the stopper portions are composed of end members attached and fixed on both ends of the rotor.

4. The capacitance-type displacement measuring device according to claim 3 wherein at least one of the end members is provided with a engaging means to engage to a rotator as a subject of displacement measuring.

5. The capacitance-type displacement measuring device according to claim 2, wherein the forcing means are composed of a plate spring to force the stator in a first direction orthogonal to a rotation axis of the rotor, an end of the plate spring being fixed, and the other end of the plate spring being abutted to the stator, the plate spring being provided with a curved portion between the fixed end and the other end, displaceable in a second direction orthogonal to the rotation axis of the rotor and also orthogonal to the first direction.

6. The capacitance-type displacement measuring device according to claim 2, wherein the forcing means is composed of a pair of plate springs, an end of the plate springs being fixed, and the other end of the plate springs being abutted to the stator, the plate spring being provided with curved portions between the fixed end and the other end, displaceable in a second direction orthogonal to the rotation axis of the rotor and also orthogonal to the first direction.

7. The capacitance-type displacement measuring device according to claim 6, wherein the pair of the plate springs are connected with each other at the fixed ends thereof.

8. The capacitance-type displacement measuring device according to claim 7, wherein a projection is provided on the stator on which the other end of the plate spring is abutted, and an engaging hole engaging with the projection is provided on each of the plate springs.

9. A displacement measuring device used for a micrometer provided with a main body having an anvil at an end, and a spindle screwed onto the other end of the main body to displace with a screw rotation thereof, to detect a displacement amount of the spindle in the axial direction, the spindle being provided with a rotatable rotor located on the spindle, having circular outer circumferential face, and the main body being provided with a stator located at a predetermined gap against the outer circumferential face of the rotor, having half-cylindrical inner circumferential face, wherein;

the inner circumferential face of the stator is provided with transmitting electrode group, each electrode being impressed with respectively different-phased alternating signals, and a receiving electrode insulated from the transmitting electrode group, of which a receive signal is inputted into measuring circuit, the outer circumferential face of the rotor is provided with a coupling electrode to couple capacitively with a plural of electrode of the transmitting electrode group, the both ends of the outer circumferential face of the rotor being provided with a step portion on both ends of the outer circumferential faces of the rotor to retain a predetermined gap between the opposing faces of the stator and the rotor, a stopper portion on both ends of the outer circumferential faces of the rotor to be abutted to both end faces of the stator in the axial direction, and a forcing means to force the stator to the rotor so that the rotor and the stator are abutted at the step portion.

10. The capacitance-type displacement measuring device according to claim 9, wherein the step portion and the stopper portion are provided on end members attached and fixed at both ends of the rotor.

11. The capacitance-type displacement measuring device according to claim 10, wherein one of the end members is provided with a through-hole and through which a distal portion of a first plate spring is engaged to a groove formed on the spindle along the axial direction thereof, the base end of the first plate spring being fixed to the end member.

12. The capacitance-type displacement measuring device according to claim 11, wherein the forcing means is composed of a pair of second plate springs to force the stator in the first direction orthogonal to the rotation axial direction of the rotor having an end of the second plate springs being fixed and the other end of the second plate springs being abutted to the stator, the second plate spring being provided with curved portions between the fixed end and the other end, being displaceable in a second direction orthogonal to the rotation axis of the rotor and also orthogonal to the first direction.

13. The capacitance-type displacement measuring device according to claim 12, wherein a projection is provided on the stator on which the other end of the second plate spring is abutted, and an engaging hole to engage with the projection is provided on each of the second plate springs.

* * * * *